(12) United States Patent
Sachs

(10) Patent No.: US 11,514,406 B2
(45) Date of Patent: Nov. 29, 2022

(54) CASCADED ANALYSIS LOGIC FOR SOLUTION AND PROCESS CONTROL

(71) Applicant: SAP SE, Walldorf (DE)

(72) Inventor: Marco Sachs, Sankt Leon-Rot (DE)

(73) Assignee: SAP SE, Walldorf (DE)

( * ) Notice: Subject to any disclaimer, the term of this patent is extended or adjusted under 35 U.S.C. 154(b) by 893 days.

(21) Appl. No.: 16/045,367

(22) Filed: Jul. 25, 2018

(65) Prior Publication Data

US 2020/0034771 A1    Jan. 30, 2020

(51) Int. Cl.
*G06Q 10/00* (2012.01)
*G06Q 10/06* (2012.01)
*G06N 20/00* (2019.01)

(52) U.S. Cl.
CPC ............ *G06Q 10/20* (2013.01); *G06N 20/00* (2019.01); *G06Q 10/06375* (2013.01); *G06Q 10/067* (2013.01); *G06Q 10/06312* (2013.01); *G06Q 10/06393* (2013.01)

(58) Field of Classification Search
CPC ....... G06Q 10/06375; G06Q 10/06312; G06Q 10/06393; G06Q 10/067; G06Q 10/20; G06N 20/00
USPC ............................................ 706/12; 705/305
See application file for complete search history.

(56) References Cited

U.S. PATENT DOCUMENTS

| | | | |
|---|---|---|---|
| 2016/0350173 A1* | 12/2016 | Ahad | G06F 11/0751 |
| 2018/0025287 A1* | 1/2018 | Mathew | G06N 20/00 706/12 |
| 2019/0370218 A1* | 12/2019 | Di Pietro | G06K 9/6263 |

OTHER PUBLICATIONS

Gao, Machine Learning Applications for Data Center Optimization (2014), available at storage.googleapis.com/pub-tools-public-publication-data/pdf/42542.pdf (Year: 2014).*

* cited by examiner

*Primary Examiner* — Charles Guiliano
(74) *Attorney, Agent, or Firm* — Fountainhead Law Group P.C.

(57) ABSTRACT

In some embodiments, environment solutions are received from local solution control centers for respective companies. The environment solutions generated from environmental data received from multiple environments being operated by a respective company. The environment solutions for the environment solutions are converted to anonymous environment solutions and the environmental data to anonymous environmental data. The method applies first machine learning logic to the anonymous environment solutions for the environment solutions to generate first set of solutions and applies second machine learning logic to the anonymous environmental data to generate second set of solutions. The first set of solutions and the second set of solutions are tested for comparable solutions. One of the first set of solutions and the second set of solutions is then selected based on the testing.

20 Claims, 7 Drawing Sheets

CASCADED ANALYSIS LOGIC FOR SOLUTION AND PROCESS CONTROL

BACKGROUND

A company may operate many environments, such as platform-as-a-service (PAAS), infrastructure-as-a-service (IAAS), private cloud, public cloud, or other platforms on premise. The company may run different processes that may be designed to be independent of the environment that the process is running on. Thus, if one environment has an issue, then the complete process may not work due to the issue on one of the environments. In the worst-case scenario, the process may stop working and possibly the production would stop.

Each platform may have its own control center that may evaluate problems within the environment. However, since processes may be performed on multiple environments, a solution on one environment may not be the best solution for another environment.

DETAILED DESCRIPTION

Figure 1:
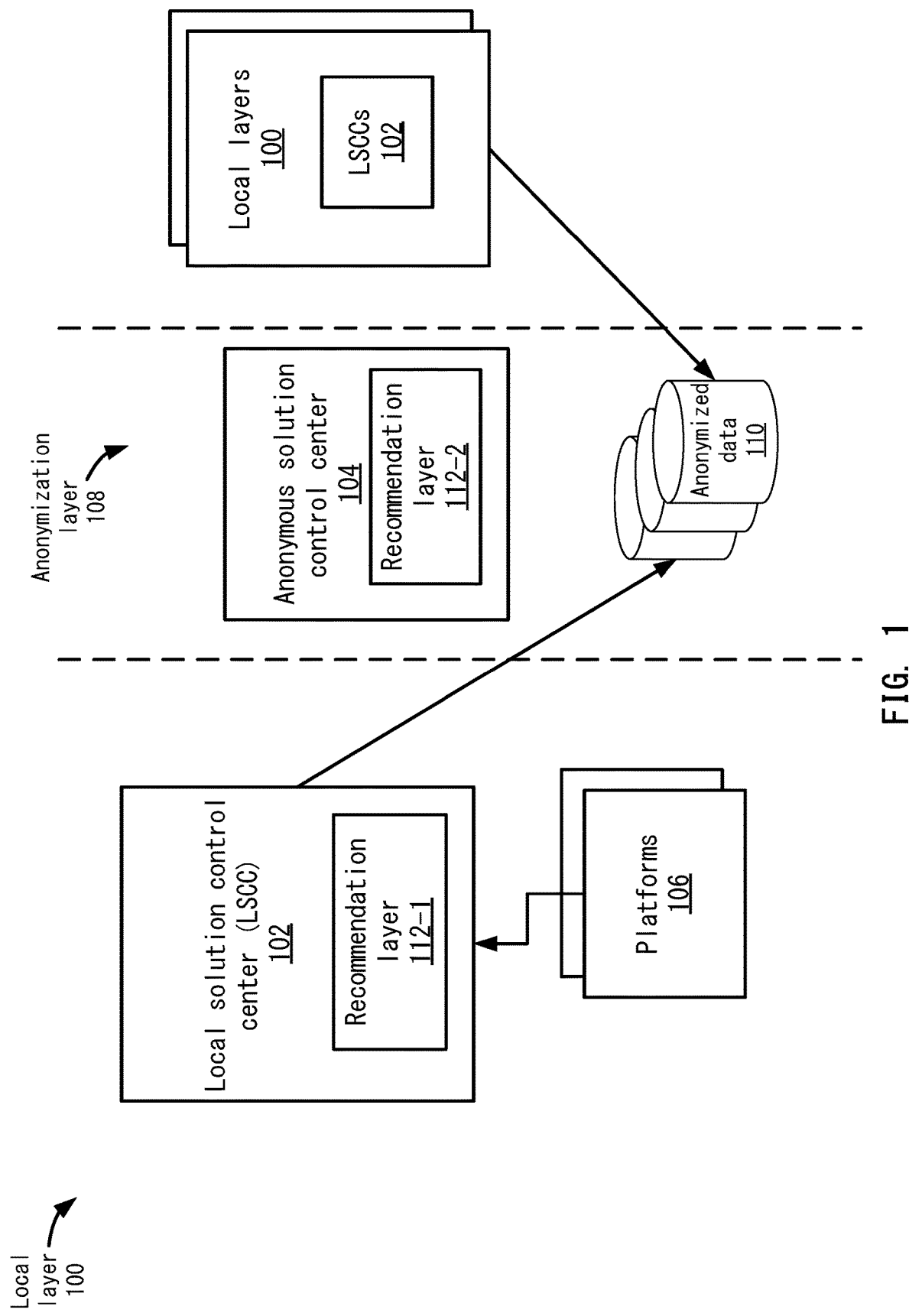
FIG. 1 depicts a simplified system for a solution control center according to some embodiments.

Described herein are techniques for a control system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments provide a solution control center and a process control center to monitor platforms and processes performed by applications on the platforms for a company. The solution control center and the process control center may run locally on the premises of the company and analyze the operations of the platforms and the applications that are run by the company.

In addition to running locally, the solution control center and the process control center may send data to a service provider, which can combine the data with other data from other solution control centers and process control centers from other companies. The company may convert the data from into anonymous data in an anonymization layer. Or, the service provider could convert the data into anonymous data. Then, the service provider may analyze the anonymous data and provide additional solutions back to the solution control center and process control center for the company. These solutions using the anonymous data may be more robust than just using the local data for a company because using other companies' data may enhance the local data allowing different solutions to be determined. Also, using anonymous data may honor the privacy of the companies. The solution control center and the process control center for the company may then use the locally-determined solutions in addition to the solutions received from the service provider. The use of the locally-determined solutions and the solutions provided by the service provider using the anonymous data may provide better insight into how to improve the platforms or operations of the company.

In the solution control center, solutions from local solution centers for respective companies are received. The solutions are generated from environmental data received from multiple platforms being operated by a respective company. Additionally, the service provider receives the environmental data from the respective companies. The company may have converted the data for the solutions and the environmental data into anonymous data. First machine learning logic is applied to the anonymous solution data for the solutions to generate a first set of solutions. The machine learning logic may receive the solutions as input and then determine whether the solutions were the highest rated solution and also determine other solutions referred to as a first set of solutions. Also, second machine learning logic is applied to the anonymous environmental data to generate a second set of solutions. The second machine learning logic receives the environmental data as input and can then output solutions based on the environmental data received.

The service provider then tests the first set of solutions and the second set of solutions from comparable solutions. For example, environmental data that a company used to generate a solution and the solution forms comparable solutions. The first machine learning logic used the solution to generate a first solution. The first solution is tested against a second solution generated from the second machine learning logic using similar environmental data. This tests which of the first machine learning logic or the second machine learning logic generated the better solution. In some embodiments, the testing may involve sending the first solution and the second solution to a company for testing. After the testing, the service provider may select one of the first solution and the second solution based on the results of the testing, and the selected solution is provided to other companies. The other companies can then apply the solution to their respective environments or applications.

The above process applies cascaded machine learning logic to generate solutions for respective companies. The cascading of the machine learning may generate better solutions than just applying machine learning to one of the data sets. That is, applying machine learning to both the solutions generated and the original environmental data in addition to using anonymous data from other companies improves the solution generation process.

Solution Control Center

FIG. 1 depicts a simplified system for a solution control center according to some embodiments. The system includes a local layer 100 and an anonymization layer 108. Local layer 100 may be operated privately by a respective company. That is, local layer 100 may include environments 106 that are private to a company. Anonymization layer 108 may store anonymous data in storage 110. The data from multiple companies may be converted into anonymous data that cannot be attributed to any company.

Local layer 100 includes a local solution control center (LSCC) 102 that is operated by a company (e.g., privately or locally to the company). Local solution control center 102 may receive environmental data from environments 106. Environments 106 may include computing devices that run different models, such as PAAS, IAAS, private cloud, public cloud, and so on. The environmental data may include information regarding the operation of environments 106, such as heartbeat parameters or network response parameter. The heartbeat parameters are sent by environments when they are operating correctly and the network response parameters are how long an environment takes to respond, such as to a status request. Some examples of environmental data include ping times, login access success, current computer processing unit (CPU) load, current memory consumption, machine data, CPU type, memory type and size, hardware component data, CPU temperature, database size, number of database volumes, database size statistics, system workload, number of users logged in, type of users logged in, of operations per time period, network speed to other systems, and other data that classifies the health of a system.

Figure 2:
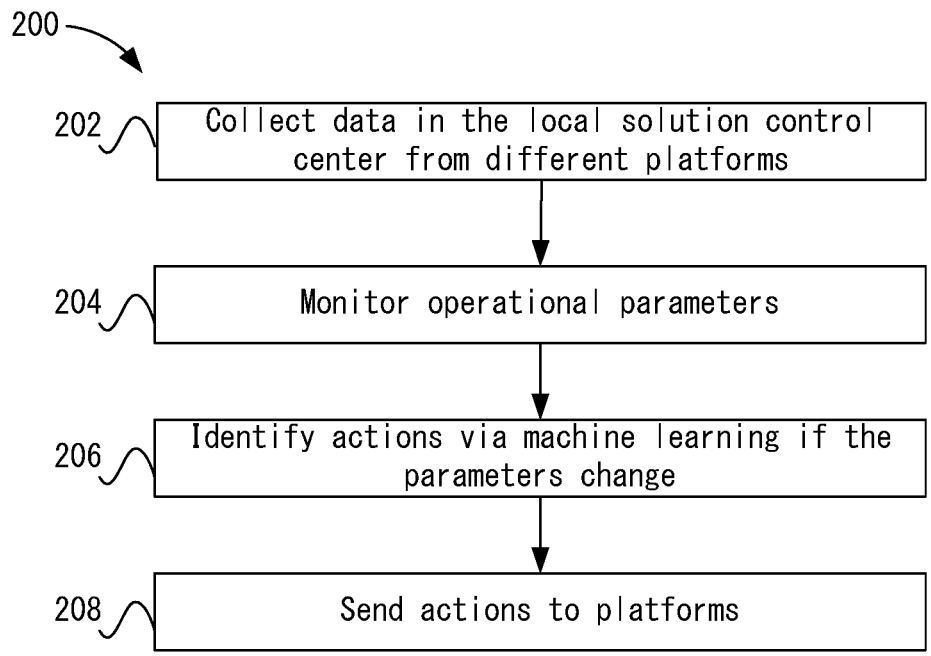
FIG. 2 depicts a simplified flowchart of a method for analyzing environmental data at a local layer according to some embodiments.

A recommendation layer 112-1 may analyze the environmental data from multiple environments 106 in a central location. Recommendation layer 112-1 can then determine solutions based on a view of all environments 106 being run by the company. In some embodiments, recommendation layer 112-1 may determine solutions due to possible failures of one or more models in environments 106. The solutions may include actions to take to resolve any failures or to prevent any future failures. In some embodiments, recommendation layer 112-1 may use machine learning logic to determine the solutions. The machine learning logic may be trained to receive environmental data as input and then output solutions based on the environmental data FIG. 2 depicts a simplified flowchart 200 of a method for analyzing environmental data at a local layer 100 according to some embodiments. At 202, recommendation layer 112-1 collects data from different environments 106. As discussed above, the environmental data may include heartbeat parameters.

At 204, recommendation layer 112-1 monitors operational parameters, such as the heartbeat parameters. At 206, recommendation layer 112-1 identifies actions via the machine learning logic if the parameters change. The machine learning logic can create additional solutions for possible issues. The solutions may be automatically performed, such as by an artificial intelligence (AI) entity. AI entity may be customer specific, however. The solutions may be generic, e.g., a solution is extending a database file on a database. The AI entity is a customer specific entity that can extend a specific type of database being used at the customer. Additional ways to generate solutions with anonymous data will be described below.

At 208, recommendation layer 112-1 sends actions to environments 106 to perform. For example, the actions may be applied at environments 106 to possibly prevent future failures or to recover from currently occurring failures. As discussed above, an AI entity may perform the actions.

Referring back to FIG. 1, anonymization layer 108 receives environmental data and solutions from local solution control center 102 and the data is stored in storage 110 as anonymous data. Anonymization layer 108 may convert the data to anonymous data by removing any information regarding the company from the data. Anonymization layer 108 may be implemented at the edge of each customer and convert customer specific data to anonymous data. Additionally, an anonymous solution control center 104 may receive environmental data and solutions from other local layers 100 from other companies and convert this data to anonymous data also.

Anonymous solution control center 104 can then analyze the anonymous data from multiple companies. Analyzing multiple companies' data may provide better solutions to companies that are only analyzing their own data. Anonymous solution control center 104 includes a recommendation layer 112-2 that may be similar to the recommendation layer 112-1 in local solution control centers 102. Recommendation layer 112-2 may separately apply machine learning logic to the anonymous environmental data to determine solutions and then to the solutions generated to determine other solutions. As will be discussed in more detail below, a cascaded machine learning structure may be used where recommendation layer 112-2 may input the solutions generated by local solution control centers 102 into first machine learning logic to generate other solutions. One possible way is to compare: all solutions from different companies for similar issues, weight the issues e.g., by success information of the corresponding databases and then make an interpolation of them. In addition, recommendation layer 112-2 may run similar machine learning logic as a company based on just the environmental data from multiple companies and run different machine logic of the data and later compare the results of both ways. Also, recommendation layer 112-2 may use the environmental data that local solution control centers 102 used to generate new solutions. The machine learning logic used may take into account the environmental data from multiple companies to generate the solutions. This is different from using only the company's environmental data to generate solutions. Thus, recommendation layer 112-2 may generate different solutions from environmental data for similar models or environments.

Recommendation layer 112-2 may then test the solutions that are determined from the first machine learning logic and the second machine learning logic. The best solution may then be sent to other local layers 100 for different companies.

Process Control Center

Figure 3:
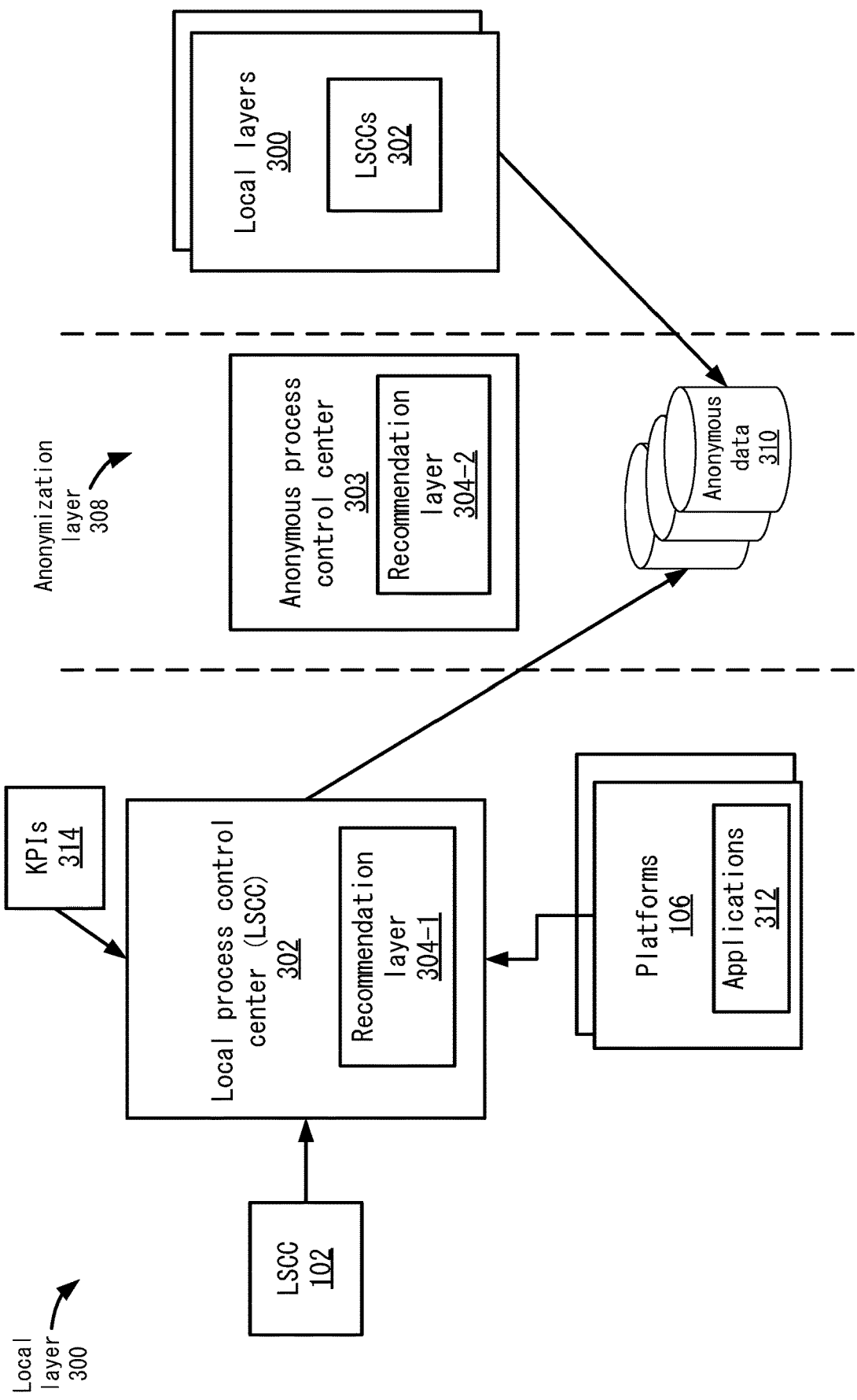
FIG. 3 depicts an example of a system using a local process control center according to some embodiments.

Some embodiments may also use a local process control center (LPCC) to monitor processes being performed by or within applications. FIG. 3 depicts an example of a system using a local process control center 302 according to some embodiments. The system includes a local layer 300 that is local to a respective company and an anonymization layer 308 that receives anonymous data from multiple local layers 300. Local process control center 302 may centralize the process monitoring and may monitor a status of processes when executed by applications 312 in environments 106. A process may be a series of transactions in a process chain that may be performed by an application 312. For example, a transaction may be performed by a machine or human, such as an order may be received and processed, a bill may be paid, etc. The process may be different from an environment in that the environment includes all applications being executed on the environment whereas a process may be at the application level.

Local process control center 302 receives process data regarding the transactions in the process. A recommendation layer 302-1 may input the process data into machine learning logic to identify process relationships and an impact of the transactions to determine whether a better decision in the process can be made. For example, if a new order will be received from a customer, the order needs to be checked if the goods are available, if the customer is still trustful, is it an existing customer, etc. All these questions are answered via different processes in a system. The availability check is in the warehouse if the goods are available, the check if the customer exists is in a customer database, if all invoices paid, or is there a block on the customer. The impacts are quantified by the company KPIs. For example, the AI entity may determine whether a human needs to check if a past bill was paid before accepting a new order from a customer or how is the product quality, such as how many returns, issues, etc. before the company orders again from the supplier. Recommendation layer 304-1 can review various transactions and processes and determine recommendations. Based on the example above, a machine learning process could identify a rule where an invoice over $25,000 is still open and the customer is in the USA and deemed trustworthy, the order can be accepted, but the same situation and the customer is located in another country, the customer is not trustful anymore, due the current political situation. Either the process will stop or the AI entity runs additional checks or put this as manual interaction or warning. Machine learning logic may process the environmental data from environments 106 to determine a comprehensive view of processes, availability, stability, internal and external impact and effectiveness (e.g., speed, interaction, etc.). The AI entity can then check first if there is an environmental issue that causes the process problem and either wait until the issue is automatically fixed by the process or perform some actions that are proposed by the solution from the machine learning logic.

Local process control center 302 may receive key performance indicators (KPIs) and use the KPIs to determine recommendations for the processes.

Figure 4:
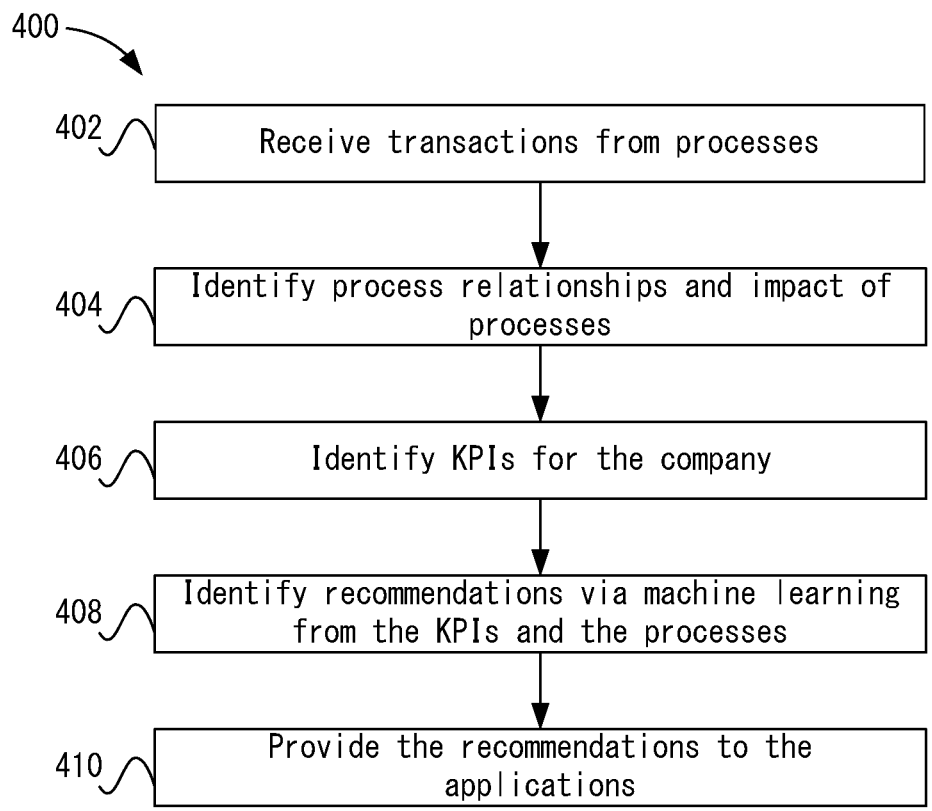
FIG. 4 depicts a simplified flowchart of a method for analyzing processes according to some embodiments.

FIG. 4 depicts a simplified flowchart 400 of a method for analyzing processes according to some embodiments. At 402, local process control center 302 receives transactions from processes. Then, at 404, local process control center 302 identifies process relationships and the impact of the processes.

At 406, local process control center 302 use company KPIs. At 408, local process control center 302 identifies recommendations via machine learning from the KPIs and the processes. Then, at 410, local process control center 302 provides the recommendations to applications 312. Applications 312 may implement the recommendations by changing the processes. For example, applications 312 may add transactions to the processes based on the recommendations.

Local solution control center 102 may also provide input to local process control center 302. Local process control center 302 may use the recommendations for solutions to improve specific processes. The solution control center keeps track of all solutions considered healthy and this needs to be transparent to the process control center. So, if the systems/environments are not healthy (e.g., slow, not available, etc.), the process control center would know and wait to start processes run on affected environments. So, the solution control center provides transparency of the environment health to the process control center.

Referring back to FIG. 3, anonymization layer 308 includes an anonymous process control center 302 that receives process data from multiple local layers 300. Anonymous process control center 302 can then covert the data to anonymous data, and store the data in storage 310. Then, a recommendation layer 304-2 analyzes the anonymized data and can determine recommendations for the processes. For example, similar to the solution control center, recommendation layer 304-2 may employ cascaded machine learning logic that can analyze the recommendations for the processes to determine first recommendations from the recommendations and also the raw process data to determine second recommendations from the process data. Recommendation layer 304-2 may then test the first recommendations and the second recommendations to determine recommendations that are highly rated. Anonymous process control center 303 may send the most highly-ranked recommendations back to local layers 300.

Self-Repair Mechanism

Figure 5:
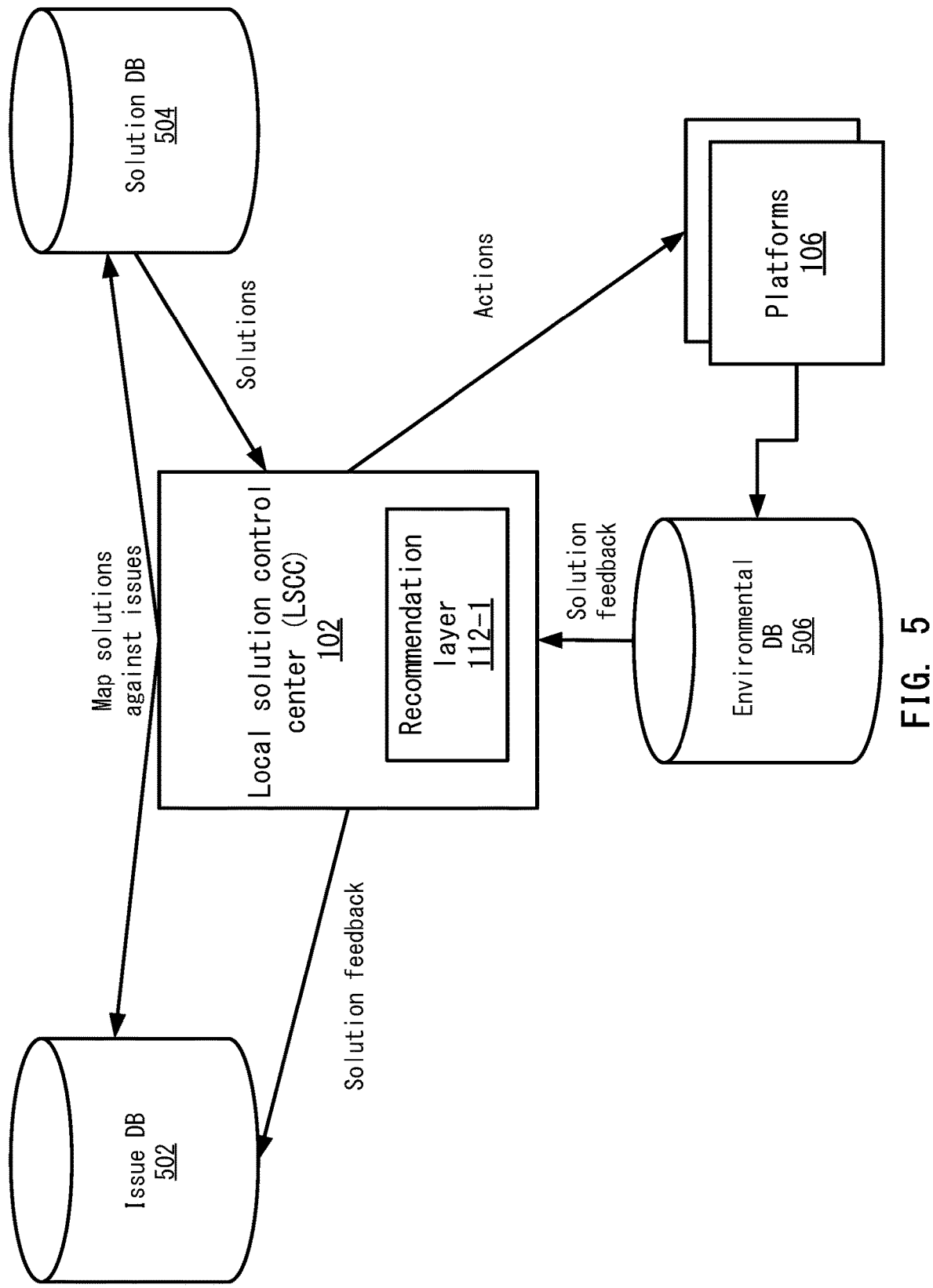
FIG. 5 depicts a simplified system of a method for performing a self-repair mechanism according to some embodiments.

Local solution control center 102 may implement a self-repair mechanism that can repair any currently-occurring problems or possible future problems. FIG. 5 depicts a simplified system 500 of a method for performing a self-repair mechanism according to some embodiments. The system includes an issue database (DB) 502, a solution database (DB) 504, and an environmental database (DB) 506. Issue DB 502 may store issues that occur from environments 106. Solution DB 504 may store solutions that are determined by recommendation layer 112-1 for the issues. Environmental DB 506 may store environmental data, such as heartbeat parameters, network reaction times, etc.

Issue DB 502 may state a database may be slow. Solution DB 504 may have a solution that when a database is slow due to it being full, the solution is to increase the database space when getting close to full. Issue DB 502 and solution DB 504 may be created based on the analysis of environmental data. Or, issue DB 502 and solution DB 504 may be created via machine learning based on issues that are input into machine learning logic and solutions that are output.

In some embodiments, the solutions may be customer-specific. Recommendation layer 112-1 may map solutions against issues and then provide actions to environments 106. Then, environments 106 provide environmental data to environmental DB 506. Solution feedback is received by recommendation layer 112-1. The solution feedback may measure any improvement from the actions in the operation of environments 106. For example, the heartbeat parameters may improve when an action is taken. Recommendation layer 112-1 then provides the solution feedback to issue DB 502.

Cascaded Machine Learning

Figure 6:
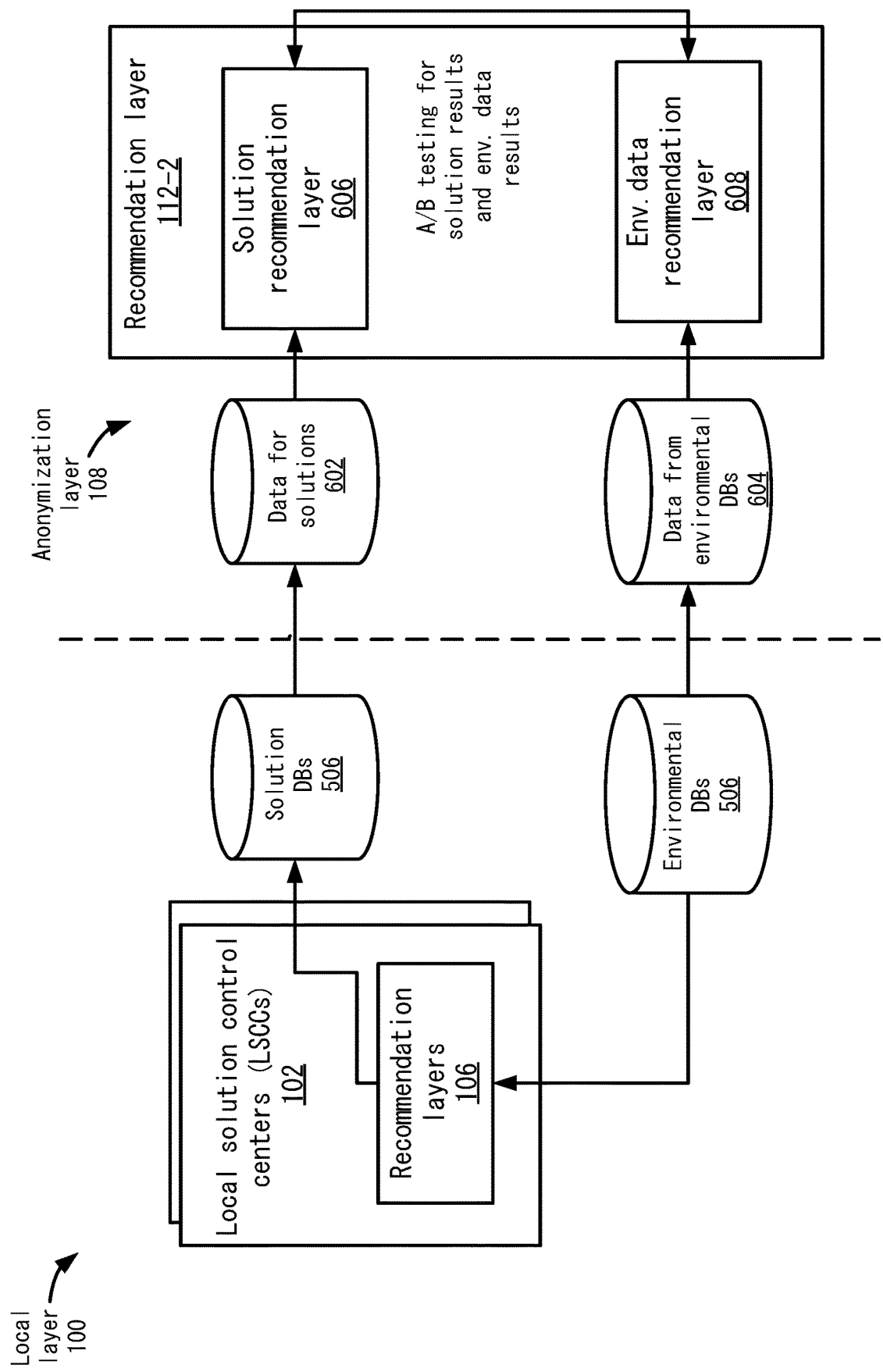
FIG. 6 depicts a cascading of machine learning for the solution control center according to some embodiments.

The machine learning logic used by anonymization layer 108 may be cascaded to improve the results of the machine learning. FIG. 6 depicts a cascading of machine learning for the solution control center according to some embodiments. Anonymization layer 108 includes database 602 that receives data of solutions from solution DBs 506 from multiple companies. Also, database 604 receives data from environmental DBs 506. The data for solutions may be the solutions that were generated by recommendation layer 106, and the data from environmental DBs 306 may be the environmental data that was used by recommendation layer 106 to generate the solutions.

Recommendation layer 112-2 includes a solution recommendation layer 606 and an environmental (ENV) data recommendation layer 608. Solution recommendation layer 606 may analyze the data from the solutions to generate other solutions. Environmental data recommendation layer 608 generates solutions from the environmental data. Environmental data recommendation layer 608 may use environmental data from multiple companies to generate these solutions. Environmental data recommendation layer 608 may generate different solutions from a company that only used its own environmental data to generate solutions.

Then, recommendation layer 112-2 may test the solution results and the environmental data results. For example, AB testing may be performed by sending the solution back to individual local solution control centers 102 and receiving results. Recommendation layer 112-2 then can compare the solution results with the results determined by solution recommendation layer 606. A database may be slowing down because of database files are 90% full. The machine learning logic identifies a best solution out of the solutions generated to be to create a new DB file and the machine learning logic over the environmental data identifies the solution to just increase the file's size. Both solutions will be sent back to the company specific solution control centers and when the solutions are used, the results (e.g., rate of success) will also be collected in the solution databases, sent to the anonymous solution control center, which can rate the solutions using the success rates.

The process control center may also cascade machine learning logic similar to the solution control center.

Example

In some embodiments, an example of an autonomous car may be developed. Local solution control center 102 may need to ensure that all online and offline systems of the car are active and running. In the case of failure, local solution control center 102 may need to take adequate actions to make the system operable again. For example, the actions may include re-starting, shutting down other non-essential services, etc., or informing the driver or other monitoring system that something is not working properly. Also, in the case of a self-healing system, local solution control center 102 may determine actions to avert a failure or to correct a failure.

Local solution control center 102 may use historical data to allow the machine learning logic to find the best solution and determine which action to take. The solution may be improved by using the anonymous data from all connected cars with their issues and solutions determined from their issues. The cascaded machine learning that uses the data from multiple companies in addition to using machine learning logic on the solutions and the environmental data improves the solutions that can be determined. The solutions may keep the system completely anonymous.

Local solution control centers 102 may be running on multiple sub-systems. Different KPIs may be used for different sub-systems to make sure each sub-system is working properly. For example, the solutions may be informing the driver to take over, stopping the car on the side of the road, etc. Using the anonymous data, solutions for multiple autonomous cars may be provided to ensure that an autonomous car fleet may be fully operating.

Conclusion

Accordingly, the cascading of machine learning may provide better solutions for environments 106. The use of the anonymization layer may allow solutions to be determined from data from multiple companies. This may provide better results and solutions because the data from multiple companies may be more robust.

System

Figure 7:
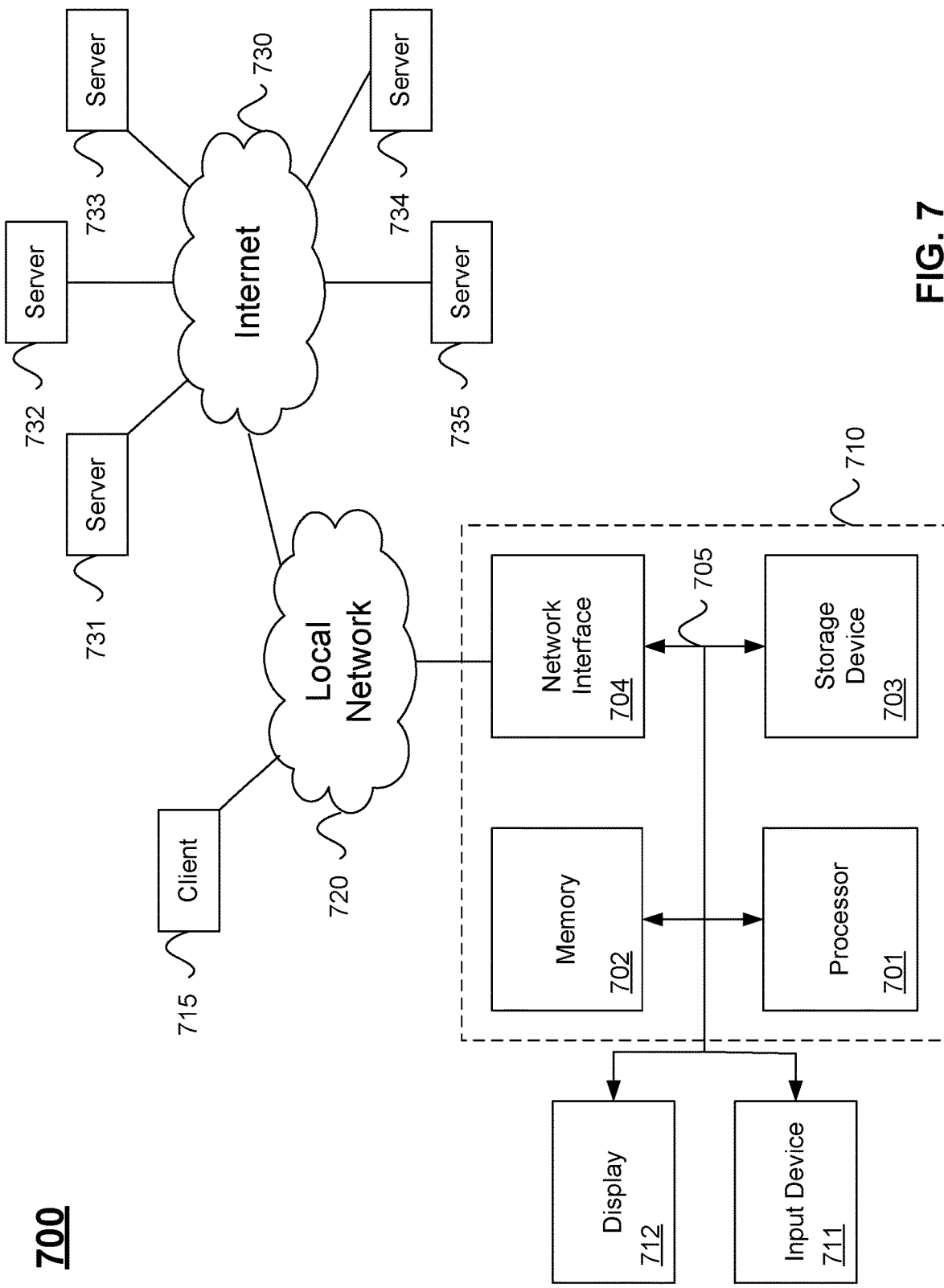
FIG. 7 illustrates hardware of a special purpose computing machine configured with a solution control center or a process control center according to one embodiment.

FIG. 7 illustrates hardware of a special purpose computing machine configured with a solution control center or a process control center according to one embodiment. An example computer system 710 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable storage mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information through the network interface 704 across a local network 720, an Intranet, or the Internet 730. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:

receiving, by a computing device, computer environment solutions that are repairs to a computer environment operated at respective companies that repair computer environment issues from local solution control centers for the respective companies, the computer environment solutions generated at respective local solution control centers using machine learning logic trained to receive computer environmental data as input and output solutions based on the computer environmental data, the computer environmental data received from multiple computer environments including computing devices being operated by a respective company, wherein the computer environment solutions are converted to anonymous computer environment solutions;

receiving, by the computing device, the computer environmental data from the respective companies, wherein the computer environment data is converted to anonymous computer environmental data;

inputting, by the computing device, the anonymous computer environment solutions for the computer environment solutions to first machine learning logic to generate output of a first set of solutions including first actions to repair the computer environment issues;

inputting, by the computing device, the anonymous computer environmental data to second machine learning logic to generate output of a second set of solutions including second actions to repair the computer environment issues;

testing, by the computing device, the first set of solutions and the second set of solutions to determine comparable solutions, the comparable solutions comprising a first solution from the first set of solutions and a second solution from the second set of solutions, the second solution being generated by the second machine learning logic using the anonymous computer environmental data, the first solution being based on a solution generated by computer environmental data, the testing comprising sending, by the computing device, the first set of solutions and the second set of solutions to one or more respective companies for testing the first actions and the second actions by implementing repairs on a respective computer environment operated at the one or more respective companies that repair the computer environment issues, and receiving, by the computing device, results from the one or more respective companies based on success of implementing the first actions of the first set of solutions and the second actions of the second set of solutions on the respective computer environment;

selecting, by the computing device, one of the first set of solutions and the second set of solutions from the comparable solutions based on the results of the testing; and sending, by the computing device, the selected one of the first set of solutions and the second set of solutions to one or more respective companies.

2. The method of claim 1, wherein the one or more respective companies implement the selected one of the first set of solutions and the second set of solutions.

3. The method of claim 1, wherein the selected one of the first set of solutions and the second set of solutions is a computer environment solution for a computer environment being run by a respective company.

4. The method of claim 1, wherein the selected one of the first set of solutions and the second set of solutions is used to alter a process solution for a process being executed by a computer environment being run by a respective company.

5. The method of claim 1, wherein the local control centers apply third machine learning logic to generate the computer environment solutions.

6. The method of claim 1, wherein local process control centers apply third machine learning logic to generate process solutions for processes being run on the computer environments for the respective companies.

7. The method of claim 6, wherein the local process control centers apply the one of the first set of solutions and the second set of solutions to alter the process solutions.

8. The method of claim 1, further comprising:

receiving, by the computing device, process solutions from local process control centers for respective companies, the process solutions generated from process data received from multiple environments being operated by a respective company, wherein the process solutions are converted to anonymous process solutions;

receiving, by the computing device, the process solutions from the respective companies, wherein the process data is converted to anonymous process data;

applying, by the computing device, first machine learning logic to the anonymous process solutions for the solutions to generate a third set of solutions;

applying, by the computing device, second machine learning logic to the anonymous process data to generate a fourth set of solutions;

testing, by the computing device, the third set of solutions and the fourth set of solutions for comparable solutions; and selecting, by the computing device, one of the third set of solutions and the fourth set of solutions based on the testing.

9. The method of claim 8, further comprising: sending, by the computing device, the selected one of the third set of solutions and the fourth set of solutions to one or more respective companies.

10. The method of claim 9, wherein the one or more respective companies implement the selected one of the third set of solutions and the fourth set of solutions.

11. The method of claim 1, wherein the one of the first set of solutions and the second set of solutions is used to self-repair an environment being operated at a respective company based on company specific requirements.

12. The method of claim 1, wherein the one of the first set of solutions and the second set of solutions is used to self-repair a process being operated on an environment at a respective company based on company specific requirements.

13. A non-transitory computer-readable storage medium containing instructions, that when executed, control a computer system to be configured for:

receiving computer environment solutions that are repairs to a computer environment operated at respective companies that repair computer environment issues from local solution control centers for the respective companies, the computer environment solutions generated at respective local solution control centers using machine learning logic trained to receive computer environmental data as input and output solutions based on the computer environmental data, the computer environmental data received from multiple computer environments including computing devices being operated by a respective company, wherein the computer environment solutions are converted to anonymous computer environment solutions;

receiving the computer environmental data from the respective companies, wherein the computer environment data is converted to anonymous computer environmental data;

inputting the anonymous computer environment solutions for the computer environment solutions to first machine learning logic to generate output of a first set of solutions including first actions to repair the computer environment issues;

inputting the anonymous computer environmental data to second machine learning logic to generate output of second set of solutions including second actions to repair the computer environment issues;

testing the first set of solutions and the second set of solutions to determine comparable solutions, the comparable solutions comprising a first solution from the first set of solutions and a second solution from the second set of solutions, the second solution being generated by the second machine learning logic using the anonymous computer environmental data, the first solution being based on a solution generated by computer environmental data, the testing comprising sending the first set of solutions and the second set of solutions to one or more respective companies for testing the first actions and the second actions by implementing repairs on a respective computer environment operated at the one or more respective companies that repair the computer environment issues, and receiving results from the one or more respective companies based on success of implementing the first actions of the first set of solutions and the second actions of the second set of solutions on the respective computer environment;

selecting one of the first set of solutions and the second set of solutions from the comparable solutions based on the results of the testing; and sending the selected one of the first set of solutions and the second set of solutions to one or more respective companies.

14. The non-transitory computer-readable storage medium of claim 13, wherein the selected one of the first set of solutions and the second set of solutions is a computer environment solution for an environment being run by a respective company.

15. The non-transitory computer-readable storage medium of claim 13, wherein the selected one of the first set of solutions and the second set of solutions is used to alter a process solution for a process being executed by a computer environment being run by a respective company.

16. An apparatus comprising:
one or more computer processors; and
a non-transitory computer-readable storage medium comprising instructions, that when executed, control the one or more computer processors to be configured for:
receiving environment solutions that are repairs to a computer environment operated at respective companies that repair environment issues from local solution control centers for the respective companies, the computer environment solutions generated at respective location solution control centers using machine learning logic trained to receive computer environmental data as input and output solutions based on the computer environmental data, the computer environmental data received from multiple environments including computing devices being operated by a respective company, wherein the computer environment solutions are converted to anonymous environment solutions;

receiving the computer environmental data from the respective companies, wherein the computer environment data is converted to anonymous environmental data;

inputting the anonymous environment solutions for the computer environment solutions to first machine learning logic to generate output of first set of solutions including first actions to repair the computer environment issues;

inputting the anonymous environmental data to second machine learning logic to generate output of second set of solutions including second actions to repair the computer environment issues;

testing the first set of solutions and the second set of solutions to determine comparable solutions, the comparable solutions comprising a first solution from the first set of solutions and a second solution from the second set of solutions, the second solution being generated by the second machine learning logic using anonymous environmental data from at least a respective company, the first solution being based on a solution generated by environmental data by at least the respective company, the testing comprising sending the first set of solutions and the second set of solutions to one or more respective companies for testing the first actions and the second actions by implementing repairs on a respective computer environment operated at the one or more respective companies that repair the computer environment issues, and receiving results from the one or more respective companies based on success of implementing the first actions of the first set of solutions and the second actions of the second set of solutions on the respective environment;

selecting one of the first set of solutions and the second set of solutions from the comparable solutions based on the results of the testing, and sending the selected one of the first set of solutions and the second set of solutions to one or more respective companies.

17. The method of claim 1, wherein the results include rate of success, and wherein the selecting of one of the first set of solutions and the second set of solutions from the comparable solutions is based on the rate of success.

18. The method of claim 1, wherein the computing devices operate models including platform-as-a-service, infrastructure-as-a-service, private cloud, or public cloud.

19. The method of claim 1, wherein the anonymous computer environmental data input to the second machine learning logic includes anonymous computer environmental data received from multiple companies.

20. The method of claim 1, wherein the use of the anonymous environment solutions and the anonymous environmental data allows the first set of solutions and the second set of solutions to be determined from data from multiple companies.

* * * * *